United States Patent
Miyawaki et al.

(10) Patent No.: US 12,358,557 B2
(45) Date of Patent: Jul. 15, 2025

(54) VEHICLE CONTROL DEVICE, VEHICLE CONTROL METHOD, AND STORAGE MEDIUM STORING VEHICLE CONTROL PROGRAM

(71) Applicant: TOYOTA JIDOSHA KABUSHIKI KAISHA, Toyota (JP)

(72) Inventors: Jiro Miyawaki, Ebina (JP); Kinya Ishizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 18/424,423

(22) Filed: Jan. 26, 2024

(65) Prior Publication Data

US 2024/0343304 A1 Oct. 17, 2024

(30) Foreign Application Priority Data

Apr. 17, 2023 (JP) ................. 2023-067058

(51) Int. Cl.
*B62D 15/00* (2006.01)
*B62D 15/02* (2006.01)

(52) U.S. Cl.
CPC ................. *B62D 15/025* (2013.01)

(58) Field of Classification Search
CPC .................................................. B62D 15/025
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 12,091,082 B2 * | 9/2024 | Tomoi | B62D 15/021 |
| 2016/0362136 A1 * | 12/2016 | Oya | B62D 5/0454 |
| 2020/0010111 A1 * | 1/2020 | Tsubaki | B62D 5/0463 |
| 2020/0377148 A1 | 12/2020 | Nakade et al. | |
| 2021/0001922 A1 | 1/2021 | Aoyama | |

FOREIGN PATENT DOCUMENTS

| | | |
|---|---|---|
| JP | 2019-166949 A | 10/2019 |
| JP | 2020-192855 A | 12/2020 |
| JP | 2021-11190 A | 2/2021 |

* cited by examiner

*Primary Examiner* — Jacob M Amick
(74) *Attorney, Agent, or Firm* — Sughrue Mion, PLLC

(57) ABSTRACT

A processor of a vehicle control device controls an electric motor such that torque for operating a steering wheel when a driver performs an operation to rotate the steering wheel matches a predetermined first target value in a predetermined first traveling scene in which lane tracing control is being executed, and controls the electric motor such that the torque for operating the steering wheel when the driver performs an operation to rotate the steering wheel matches a second target value that is less than the first target value in a predetermined second traveling scene in which the lane tracing control is being executed, the second traveling scene being predefined as a traveling scene in which the steering wheel is operated to rotate less frequently than the first traveling scene.

5 Claims, 6 Drawing Sheets

VEHICLE CONTROL DEVICE, VEHICLE CONTROL METHOD, AND STORAGE MEDIUM STORING VEHICLE CONTROL PROGRAM

CROSS-REFERENCE TO RELATED APPLICATION

This application claims priority to Japanese Patent Application No. 2023-067058 filed on Apr. 17, 2023, incorporated herein by reference in its entirety.

BACKGROUND

1. Technical Field

The present disclosure relates to a vehicle control device, a vehicle control method, and a storage medium storing a vehicle control program that control a steering device such that a host vehicle travels along a travel lane.

2. Description of Related Art

There is proposed a vehicle control device that can execute lane tracing control in which a steering device is controlled such that a host vehicle travels along a travel lane (see Japanese Unexamined Patent Application Publication No. 2021-11190 (JP 2021-11190 A), for example). A processor of the vehicle control device according to JP 2021-11190 A (hereinafter referred to as a "conventional device a1") computes a target value $\theta d$ for a steering angle $\theta s$ for causing the host vehicle to travel along a target travel line Ld based on information acquired from various sensors. Then, the processor controls an electric motor of the steering device such that the steering angle $\theta s$ (actually measured value) of the host vehicle matches the target value $\theta d$.

SUMMARY

In a situation where the host vehicle is traveling along the target travel line Ld ($\theta s = \theta d$) due to the lane tracing control being executed, the driver occasionally performs an operation to rotate a steering wheel (steering override) in order to change lanes, avoid obstacles, etc., for example. That is, the steering angle $\theta s$ deviates from the target value $\theta d$. While the conventional device a1 interrupts the lane tracing control in this case, there is also proposed a vehicle control device (hereinafter referred to as a "conventional device a2") configured to continue the lane tracing control. A processor of the conventional device a2 controls an electric motor such that steering torque Ts is reduced when an operation to rotate a steering wheel is performed while the lane tracing control is executed.

In travel scenes in which the driver frequently performs an operation to rotate the steering wheel while the lane tracing control is executed, the steering torque Ts (reaction force) is preferably small (the operation feel is light) in order to reduce fatigue of the driver. In travel scenes in which the driver less frequently performs an operation to rotate the steering wheel while the lane tracing control is executed, on the other hand, the steering torque Ts (reaction force) is preferably large (the operation feel is heavy) in order to suppress the driver unintentionally performing an operation to rotate the steering wheel. With the conventional device a2, the steering torque Ts is reduced when the driver performs an operation to rotate the steering wheel during the lane tracing control, but the amount of reduction is independent of the type of the travel scene. Therefore, there is a possibility that a steering operation feel suitable for the travel scene may not be obtained.

An object of the present disclosure is to provide a vehicle control device capable of achieving a steering operation feel suitable for a travel scene.

In order to achieve the above object, an aspect of the present disclosure provides a vehicle control device including: a sensor that acquires information about a host vehicle and information about a target existing around the host vehicle; a steering device including a steering mechanism that couples a steering wheel and steered wheels of the host vehicle and an electric motor that drives the steering mechanism; and a processor that executes lane tracing control for controlling the electric motor such that the host vehicle travels along a travel lane in which the host vehicle is traveling, the processor being configured to execute steering override control for controlling the electric motor according to a mode of an operation to rotate the steering wheel when the steering wheel is operated to rotate during execution of the lane tracing control. The processor is configured to: control the electric motor such that torque for operating the steering wheel when a driver performs an operation to rotate the steering wheel matches a predetermined first target value in a predetermined first traveling scene in which the lane tracing control is being executed; and control the electric motor such that the torque for operating the steering wheel when the driver performs an operation to rotate the steering wheel matches a second target value that is less than the first target value in a predetermined second traveling scene in which the lane tracing control is being executed, the second traveling scene being predefined as a traveling scene in which the steering wheel is operated to rotate less frequently than the first traveling scene.

The processor of the vehicle control device according to the present disclosure controls the electric motor such that the torque for operating the steering wheel is reduced when the driver steers the vehicle while the lane tracing control is executed. In that event, the processor determines the amount of reduction in the operating torque according to the type of the travel scene (first travel scene or second travel scene). Thus, with the present disclosure, it is possible to achieve a steering operation feel suitable for a travel scene.

In the vehicle control device according to an aspect of the present disclosure, the first traveling scene includes at least one of a situation where a turn signal is activated, a situation where a vehicle is traveling on a general road, a situation where the vehicle is traveling in a work section, a situation where the vehicle is traveling near a large vehicle, a situation where an obstacle is detected, and a situation where preceding vehicle following control in which the vehicle travels so as to follow a preceding vehicle is executed.

This allows the operation feel of the steering wheel to be set to be relatively light in a situation where the driver frequently steers the vehicle while the lane tracing control is executed.

In the vehicle control device according to another aspect of the present disclosure, the processor is configured to control the electric motor such that the torque for operating the steering wheel when the driver performs an operation to rotate the steering wheel matches a third target value that is less than the second target value in a predetermined third traveling scene in which the lane tracing control is being executed, the third traveling scene being predefined as a traveling scene in which the steering wheel is operated to rotate less frequently than the second traveling scene; the second traveling scene is a situation where the vehicle is traveling in a hands-on mode in which the lane tracing control is executable only when the driver is holding the steering wheel; and the third traveling scene is a situation where the vehicle is traveling in a hands-off mode in which the lane tracing control is executable even if the driver is not holding the steering wheel.

In general, the driver steers the vehicle in the hands-off mode less frequently than the driver steers the vehicle in the hands-on mode. According to the present aspect, the operation feel of the steering wheel can be set to be relatively heavy in the hands-off mode in which the driver less frequently steers the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outline

A vehicle control device 1 according to an embodiment of the present disclosure is mounted on a vehicle V (hereinafter referred to as "own vehicle") that includes an autonomous driving function in which the vehicle automatically travels toward the set destination and a following function in which the vehicle travels so as to follow a preceding vehicle. The vehicle control device 1 has a function (lane tracing function) of executing lane trace control to control the own vehicle (steering device 30 described later) so that the own vehicle moves along the driving lane. The vehicle control device 1 also has a function (steering override function) of executing steering override control to control the steering device 30 in accordance with the rotation operation of the steering wheel SW when the driver rotates the steering wheel SW while executing the lane trace control.

Specific Configuration

Figure 1:
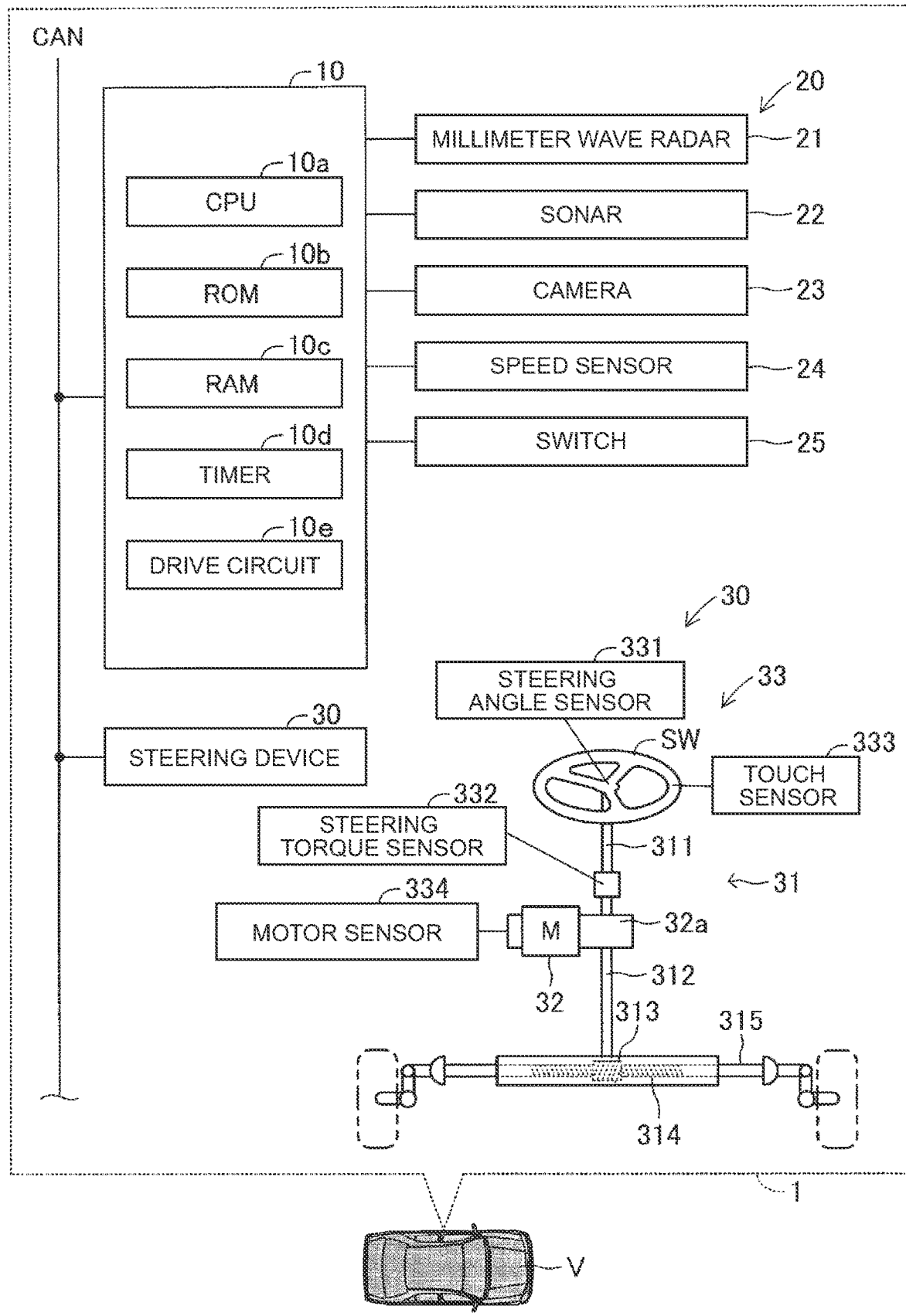
FIG. 1 is a block diagram of a vehicle control device according to an embodiment of the present disclosure.

As shown in FIG. 1, the vehicle control device 1 includes a steering support ECU 10, an on-vehicle sensor 20, and a steering device 30.

The steering support ECU 10 includes a CPU 10a, a ROM 10b, a RAM 10c, a timer 10d, and the like. Steering support ECU 10 is connected to other ECUs via CAN. The steering support ECU 10 also includes a drive circuit 10e that drives an electric motor 32, which will be described later.

The on-vehicle sensor 20 includes a millimeter wave radar 21, a sonar 22, and a camera 23 as a front sensor that acquires information regarding a target existing in front of the vehicle.

The millimeter wave radar 21 includes a transmitting/receiving section and a signal processing section. The transmitter/receiver unit emits millimeter wave band radio waves (hereinafter referred to as "millimeter waves") to the front of the vehicle and receives millimeter waves (reflected waves) reflected from three-dimensional objects located within the radiation range. The signal processing unit recognizes the distance between the own vehicle and three-dimensional objects (e.g. guardrails, poles, a preceding vehicle, etc.), the relative position (direction) of the three-dimensional object with respect to the host vehicle, etc. based on the time from the transmitter/receiver unit emits millimeter waves until the reflected waves are received, and physical quantities regarding transmitted millimeter waves and received reflected waves, and transmits the recognition results to the steering support ECU 10.

The sonar 22 intermittently emits ultrasonic waves (transmitted waves) to the surrounding area of the own vehicle, and receives ultrasonic waves (reflected waves) reflected from three-dimensional objects. The sonar 22 recognizes the distance between the own vehicle and the three-dimensional object, the relative position (direction) of the three-dimensional object with respect to the own vehicle, etc. based on physical quantities regarding transmitted waves and reflected waves, and transmits the recognition results to the steering support ECU 10.

Camera 23 includes an imaging device and an image analysis device. The imaging device has a built-in CCD, for example. The imaging device is installed at the front of the host vehicle. The imaging device photographs the foreground of the own vehicle at a predetermined frame rate and acquires image data. Each imaging device transmits image data to an image analysis device. The image analysis device analyzes the acquired image data and recognizes targets existing around the host vehicle from the image. For example, the image analysis device recognizes other vehicles, lane markings dividing driving lanes, curbs, separation strips, etc., and transmits the recognition results to the steering support ECU 10.

Furthermore, the on-vehicle sensor 20 includes a speed sensor 24. The speed sensor 24 detects the speed of the own vehicle (actual vehicle speed) and transmits the detection result to the steering support ECU 10.

Furthermore, the on-vehicle sensor 20 includes a switch 25. The switch 25 includes an operating device for the driver to request the vehicle control device 1 to execute various processes. Specifically, the switch 25 includes a push-button switch device for requesting execution of lane trace control, which will be described later.

In addition, the on-vehicle sensor 20 includes a sensor that detects the operating state of a turn signal, a navigation system that stores information about the road, a communication device that obtains information about the section under construction, and the like (not shown).

Steering device 30 includes a steering mechanism 31, an electric motor 32, and a steering sensor 33.

The steering mechanism 31 is a link mechanism that connects the steering wheel SW and the steered wheels (front left wheel and front right wheel). The steering mechanism 31 includes a torsion bar 311, a steering shaft 312, a pinion 313, a rack 314, a tie rod 315, and the like.

As the electric motor 32, for example, a brushless DC motor can be adopted. The output shaft of the electric motor 32 is connected to a steering mechanism (for example, a steering shaft 312) via a speed reduction mechanism 32*a* made up of a plurality of gears. That is, the torque of the output shaft of the electric motor 32 is applied to the steering shaft 312 via the speed reduction mechanism 32*a*. The electric motor 32 operates (forward rotation or reverse rotation) according to a command (drive signal) acquired from the drive circuit 10*e*.

The steering sensor 33 includes a steering angle sensor 331 that detects the steering angle θs, and a steering torque sensor 332 that detects the steering torque Ts based on the torsion angle of the torsion bar 311. In addition, steering sensor 33 includes a touch sensor 333. The touch sensor 333 is built into the steering wheel SW and detects whether or not the driver is gripping the steering wheel SW. Furthermore, the steering sensor 33 includes a motor sensor 334 that detects the rotation angle, output torque, etc. of the electric motor 32. The steering sensor 33 transmits these detection results to the steering support ECU 10.

Operation

The steering support ECU 10 executes the power steering control described below when the switch 25 is in the off state. Further, the steering support ECU 10 executes the lane trace control described below when the switch 25 is in the on state. In the following explanation, the right (clockwise) rotation direction of the steering wheel SW and steering shaft 312 as seen from the driver is referred to as a "positive" rotation direction, and the left (counterclockwise) rotation direction is referred to as a "negative" rotation direction. Further, various torques in the right direction (clockwise) as seen from the driver are defined as "positive", and various torques in the left direction (counterclockwise) are defined as "negative".

Power Steering Control

Figure 2:
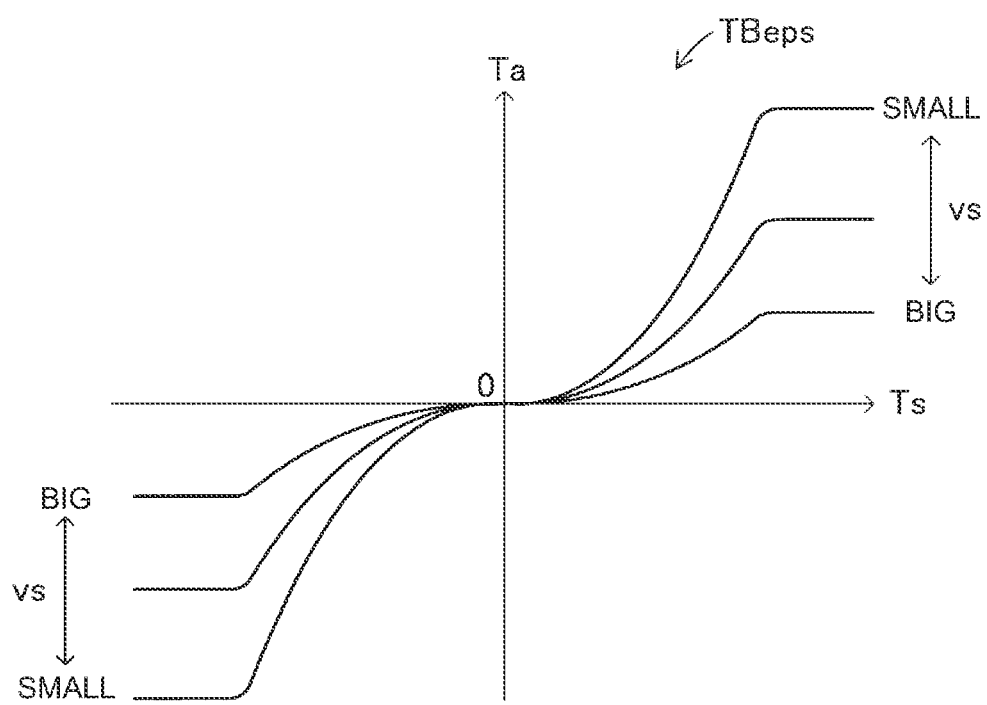
FIG. 2 is a table showing the relationship between steering torque and assist torque.

The steering support ECU 10 sequentially obtains the speed vs from the speed sensor 24 and sequentially obtains the steering angle θs and the steering torque Ts from the steering sensor 33. The steering support ECU 10 determines the torque (assist torque Ta) to be applied from the electric motor 32 to the steering shaft 312 based on the speed vs and the steering torque Ts. Here, the steering support ECU 10 stores a table TBeps (FIG. 2) that defines the relationship between the speed vs, the steering torque Ts, and the assist torque Ta. The steering support ECU 10 determines the assist torque Ta (torque value) with reference to the table TBeps. The steering support ECU 10 then controls the electric motor 32 (drive circuit 10*e*) so that the assist torque Ta is applied to the steering shaft 312. As a result, the steering torque Ts and the assist torque Ta are applied to the steering shaft 312.

Lane Tracing Control

The steering support ECU 10 recognizes the driving lane L in which the own vehicle is traveling based on information obtained from a front sensor (at least one of the millimeter wave radar 21, the sonar 22, and the camera 23). Next, the steering support calculates a target travel line Ld passing through the center of the driving lane L in the width direction based on the information. The steering support ECU 10 acquires the speed vs of the vehicle from the speed sensor 24 and the current steering angle θs from the steering sensor 33. The steering support ECU 10 calculates a target value θd of the steering angle θs based on the target travel line Ld, the speed vs, and the current steering angle θs. The steering support ECU 10 then controls the electric motor 32 (drive circuit 10*c*) so that the steering angle θs matches the target value θd. For example, when the current steering angle θs is "0°", the steering support ECU 10 gradually increases (or decreases) the torque Tm applied from the electric motor 32 to the steering shaft 312 from "0", and when the steering angle θs matches the target value θd, the torque Tm is held. In the following description, this torque value will be referred to as "lane tracing torque Td". In this state, since the driver is not steering, the steering torque Ts is approximately "0" and the shaft torque Tsft applied to the steering shaft 312 is "Td".

Note that an operation mode in which lane tracing control can be executed only when the driver lightly grips the steering wheel SW is referred to as a hands-on mode (normal mode). On the other hand, an operation mode in which lane tracing control can be executed even if the driver does not grip the steering wheel SW is referred to as a hands-off mode. For example, if the duration of the driver's attention to the road ahead in the hands-on mode exceeds a threshold value, the system shifts to the hands-off mode. In the hands-off mode, when the duration of the state in which the driver is not paying attention to the road ahead exceeds a threshold value, the mode shifts to the hands-on mode.

Steering Override Control

When the driver rotates the steering wheel SW under a situation where the steering angle θs matches the target value θd by executing the lane trace control (SOR), the vehicle control device 1 performs the following steering operation. Execute override control. In the following description, the steering angle θs (angle value) in a state where the steering is performed is referred to as "θsor". Further, the steering torque Ts (torque value) in the state where the steering is performed is denoted as "Tsor".

The steering support ECU 10 sequentially acquires various information from the steering sensor 33 while executing lane trace control. The steering support ECU 10 controls the electric motor 32 based on the steering torque Ts (=Tsor). Specifically, the steering support ECU 10 controls the electric motor 32 (drive circuit 10*c*) so that the assist torque ΔTa is applied to the steering shaft 312 as the torque Tm in addition to the lane tracing torque Td. Here, the steering support ECU 10 determines the assist torque ΔTa (torque value) with reference to the table TBsor shown in FIG. 5A. Table TBsor consists of table TBH, table TBM, and table TBL. Steering support ECU 10 selects one of these tables as follows.

Figure 5A:
FIG. 5A is a classification table and a table of driving scenes.
Figure 5A:
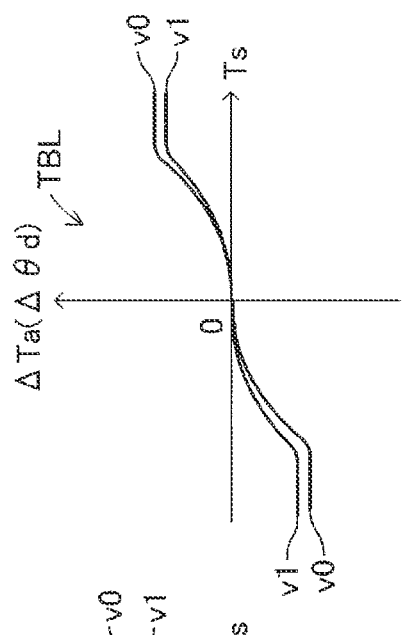

The steering support ECU 10 identifies the type of the current driving scene SCN based on the information (vs, Ts) acquired from the on-vehicle sensor 20 and the steering sensor 33. When the current driving scene SCN corresponds to a driving scene SH in which steering override occurs frequently, the steering support ECU 10 determines the assist torque ΔTa with reference to the table TBH (FIG. 5A). Further, when the current driving scene SCN corresponds to a driving scene SM in which the frequency of steering override is moderate, the steering support ECU 10 determines the assist torque ΔTa with reference to the table TBM. Further, when the current driving scene corresponds to a driving scene SL in which the frequency of steering override is low, the steering support ECU 10 determines the assist torque ΔTa with reference to the table TBL. Then, the steering support ECU 10 changes the torque Tm applied from the electric motor 32 to the steering shaft 312 from "Td" to "Td+ΔTa".

In the present embodiment, even if the own vehicle is traveling on an expressway (corresponding to driving scene SM or driving scene SL), any driving scene other than "driving on a general road" in driving scene SH is If applicable, the steering support ECU 10 determines the assist torque ΔTa with reference to the table TBH.

Figure 5B:
FIG. 5B is a classification table and a table of driving scenes.
Figure 5C:
FIG. 5C is a classification table and a table of driving scenes.
Figure 5C:
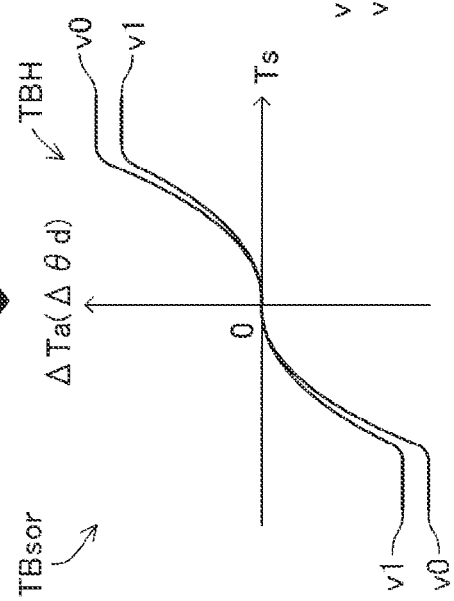

Here, as shown in FIGS. 5A, 5B, and 5C, in each table, the absolute value of the assist torque ΔTa is larger during low-speed travel (v0) than during high-speed travel (v1). Further, assuming that the speed vs in the driving scene SH and the speed vs in the driving scene SM are the same, the absolute value of the assist torque ΔTa in the driving scene SM is smaller than the absolute value of the assist torque ΔTa in the driving scene SH. Further, assuming that the speed vs in the driving scene SM and the speed vs in the driving scene SL are the same, the absolute value of the assist torque ΔTa in the driving scene SL is smaller than the absolute value of the assist torque ΔTa in the driving scene SM.

Figure 3:
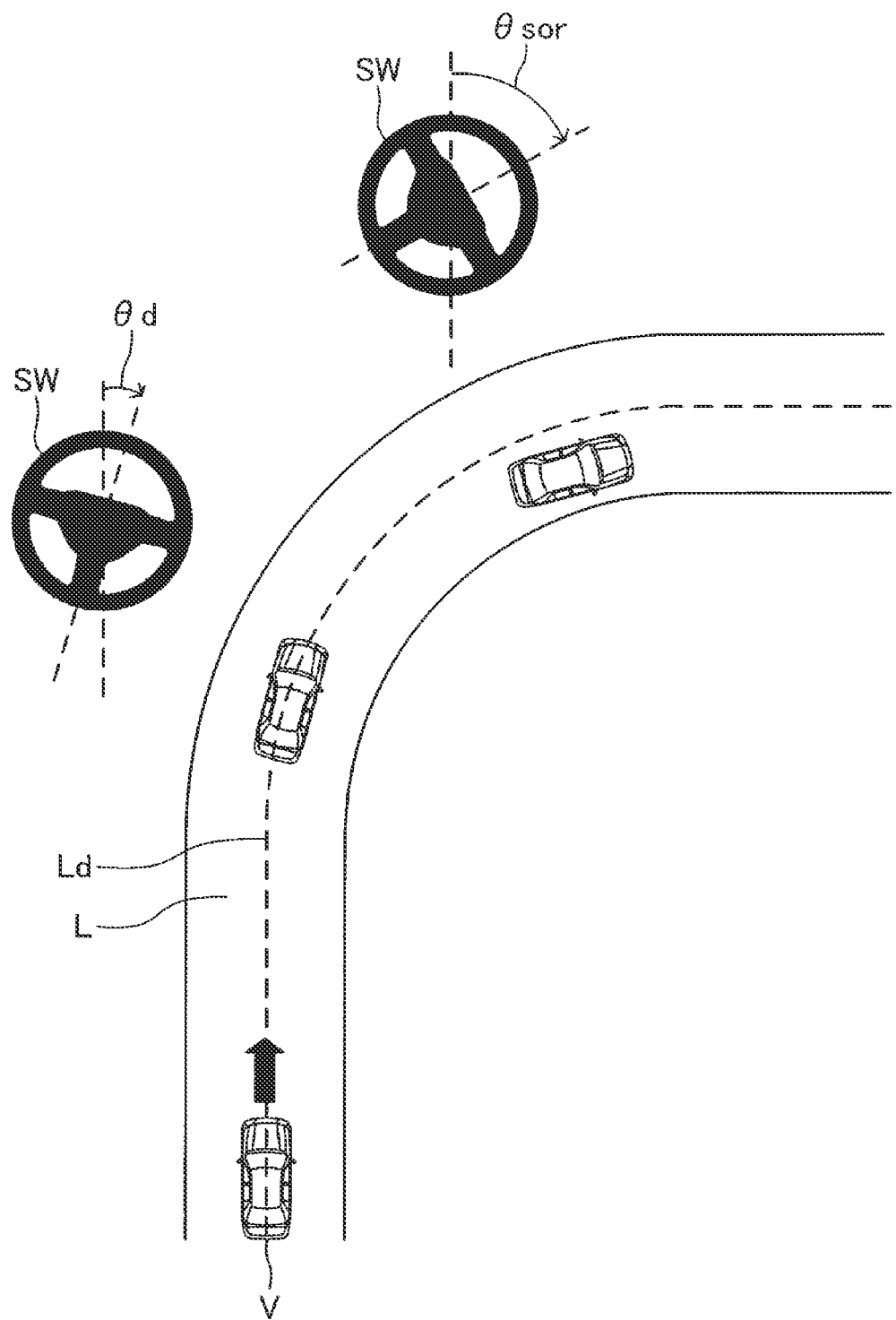
FIG. 3 is a plan view showing a situation where the steering wheel is rotated while lane tracing control is being executed.
Figure 4A:
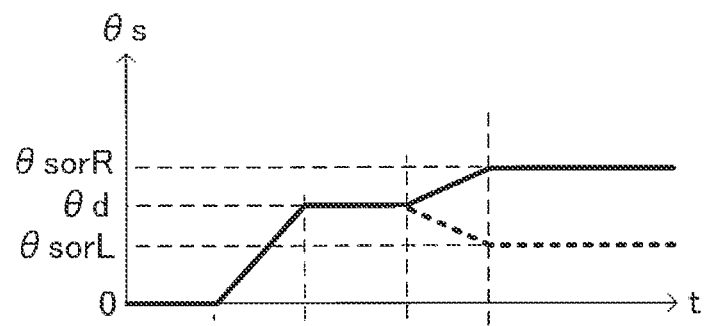
FIG. 4A is a graph showing changes in steering angle and various torques.
Figure 4B:
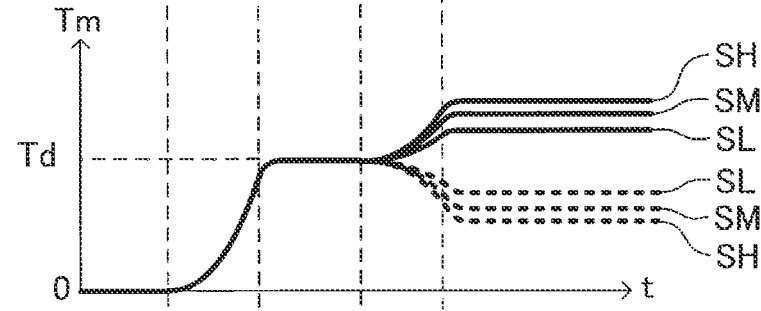
FIG. 4B is a graph showing changes in steering angle and various torques.

FIG. 3 shows an example in which the driver rotates the steering wheel SW to the right while the own vehicle is turning to the right due to lane tracing control (θs=θd). In this example, the steering angle θs increases from "0d" and reaches "θsorR", as shown by the solid line in FIG. 4A. The steering support ECU 10 recognizes the current driving scene SCN based on information acquired from the on-vehicle sensor 20 and the steering sensor 33. Then, the steering support ECU 10 selects the table (FIG. 5A, FIG. 5B, and FIG. 5C) corresponding to the driving scene SCN. For example, when the current driving scene SCN corresponds to the driving scene SH, the steering support ECU 10 selects the table TBH. Here, in this example, since the steering wheel SW is rotated clockwise, the steering torque Ts increases from "0". Therefore, as shown by the solid line in FIG. 5A, the assist torque ΔTa increases as the steering torque Ts increases. That is, as shown by the solid line in FIG. 4B, the clockwise (positive direction) torque Tm applied from the electric motor 32 to the steering shaft 312 is corrected (increased) from "Td" to "Td+ΔTa". In other words, the electric motor 32 assists the right rotation operation of the steering wheel SW. As a result, the steering torque Ts is reduced. That is, the operating feeling (weight) of the steering wheel SW is lighter than when the torque Tm applied to the steering shaft 312 from the electric motor 32 is not corrected.

Furthermore, when the current driving scene SCN corresponds to the driving scene SM, the steering support ECU 10 selects the table TBM. As shown by the solid line in FIG. 5B, the assist torque ΔTa increases as the steering torque Ts increases, but the amount of increase is smaller than in the driving scene SH. That is, the torque Tm in the clockwise direction (positive direction) applied from the electric motor 32 to the steering shaft 312 increases, but the amount of increase is slightly smaller than in the driving scene SH. Therefore, the steering torque Ts is slightly larger than that in the driving scene SH. That is, the operational feeling (weight) of the steering wheel SW is moderate.

Furthermore, when the current driving scene SCN corresponds to the driving scene SL, the steering support ECU 10 selects the table TBL. As shown by the solid line in FIG. 5C, the assist torque ΔTa increases as the steering torque Ts increases, but the amount of increase is smaller than in the driving scene SM. That is, although the torque Tm in the clockwise direction (positive direction) applied from the electric motor 32 to the steering shaft 312 increases, the amount of increase is small compared to the driving scene SM. Therefore, the steering torque Ts is larger than that in the driving scene SM. That is, the steering wheel SW has a heavy operating feel (weight). In other words, the stability of the steering wheel SW is high.

Figure 4C:
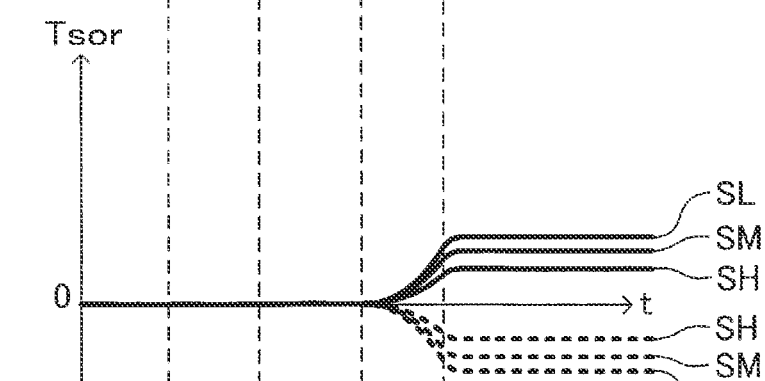
FIG. 4C is a graph showing changes in steering angle and various torques.
Figure 4D:
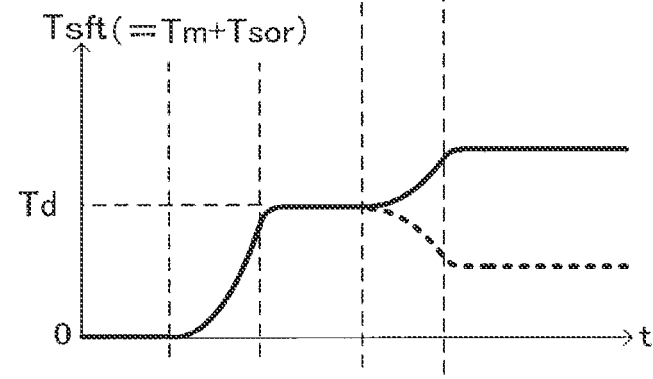
FIG. 4D is a graph showing changes in steering angle and various torques.

In the example shown in FIG. 3 described above, the driver rotates the steering wheel SW in the clockwise direction. Conversely, an example in which the driver rotates the steering wheel SW in the counterclockwise direction will be described. In this example, as shown by the broken line in FIG. 4A, the steering angle θs decreases from "θd" and reaches "θsorL". The steering support ECU 10 recognizes the current driving scene SCN based on information acquired from the on-vehicle sensor 20 and the steering sensor 33. Then, the steering support ECU 10 selects the table (FIG. 5A, FIG. 5B, and FIG. 5C) corresponding to the driving scene SCN. For example, when the current driving scene SCN corresponds to the driving scene SH, the steering support ECU 10 selects the table TBH. Here, in this example, since the steering wheel SW is rotated to the left, the steering torque Ts decreases from "0" as shown by the broken line in FIG. 4C. Therefore, as shown by the broken line in FIG. 5A, the assist torque ΔTa decreases as the steering torque Ts decreases. That is, as shown by the broken line in FIG. 4B, the torque Tm in the clockwise direction (positive direction) applied from the electric motor 32 to the steering shaft 312 decreases. In this way, by relaxing the output of the electric motor 32, the steering torque Ts is reduced. That is, the operating feeling of the steering wheel SW is lighter than when the torque Tm applied from the electric motor 32 to the steering shaft 312 is not corrected.

Further, for example, when the current driving scene SCN corresponds to the driving scene SL, the steering support ECU 10 selects the table TBL. As shown by the broken line in FIG. 5C, the assist torque ΔTa decreases as the steering torque Ts decreases, but the amount of decrease is smaller than in the driving scene SH. That is, although the torque in the clockwise direction (positive direction) applied from the electric motor 32 to the steering shaft 312 decreases, the amount of decrease is smaller than in the driving scene SH. Therefore, the steering torque Ts is larger than the driving scene SH. In other words, the steering wheel SW feels heavy to operate. In other words, the stability of the steering wheel SW is high.

Figure 6:
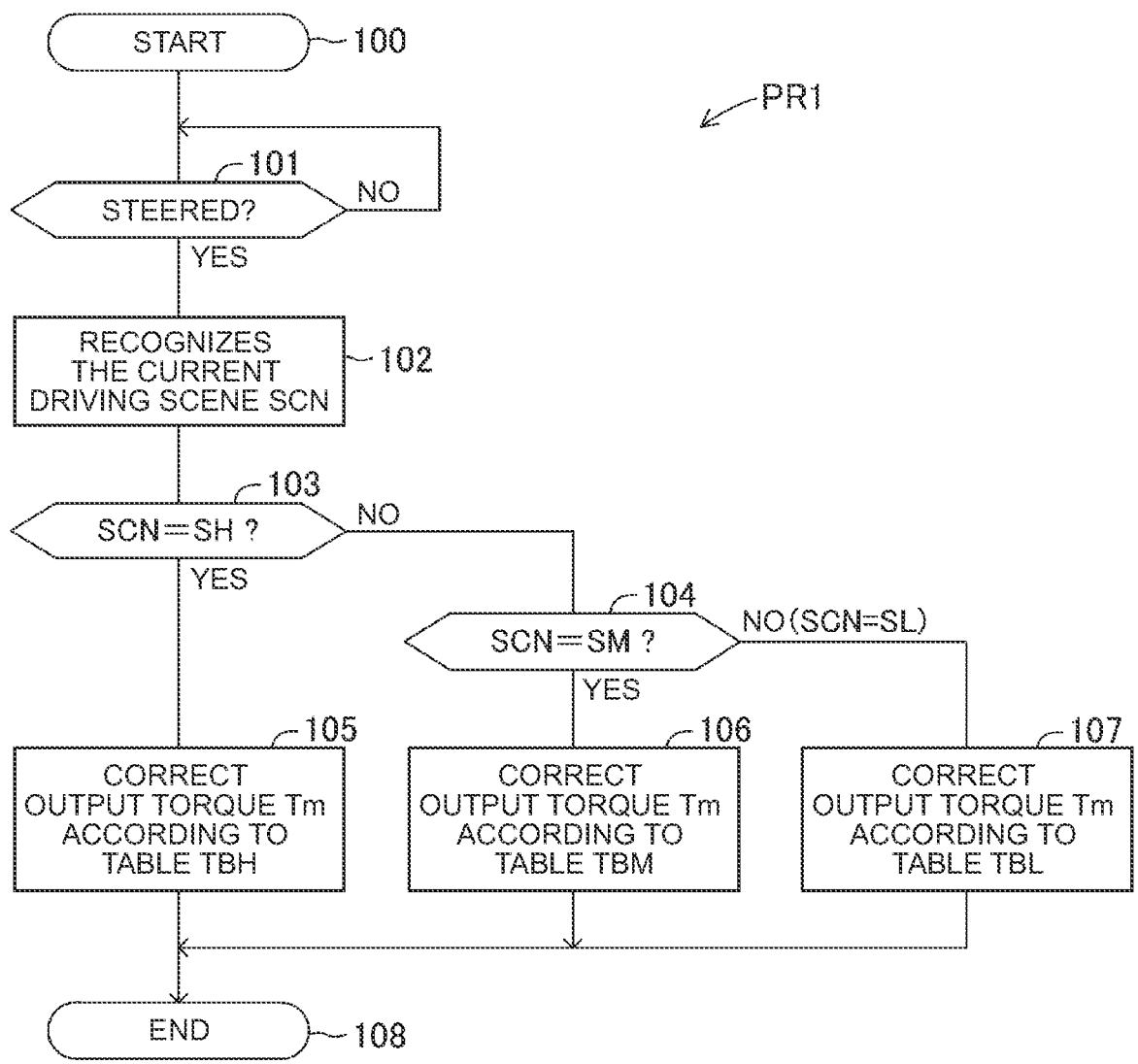
FIG. 6 is a flowchart of a program that implements the function of reducing steering torque in steering override.

Next, with reference to FIG. 6, a program PR1 executed by the CPU 10a (hereinafter simply referred to as "CPU") of the steering support ECU 10 to execute the above-mentioned steering override control will be described. The program is stored in a storage medium.

When the switch 25 is in the on state, the CPU starts executing the program PR1 at a predetermined cycle. The CPU starts executing the program PR1 from step 100 and proceeds to step 101.

When the CPU proceeds to step 101, it determines whether the steering wheel SW is being rotated (or not being steered). For example, the CPU determines that the vehicle has been steered when the steering angle θs of the steering wheel SW increases or decreases by a minute threshold value Δθs from a state in which it matches the target value θd in the lane trace Bible. If the CPU determines that the vehicle has been steered (101: Yes), the process proceeds to step 102. On the other hand, if the CPU determines that the vehicle is not being steered (101: No), the process returns to step 101.

When the CPU proceeds to step 102, it acquires various information from the front sensor and the steering sensor 33 (touch sensor 333), and recognizes the current driving scene SCN based on the information. The CPU then proceeds to step 103.

When the CPU proceeds to step 103, the CPU determines whether the current driving scene SCN corresponds to the driving scene SH (any one of FIG. 5A). When the CPU determines that the current driving scene SCN corresponds to the driving scene SH (103; Yes), the process proceeds to step 105. On the other hand, if the CPU determines that the current driving scene SCN does not correspond to the driving scene SH (103: No), the process proceeds to step 104.

When the CPU proceeds to step 104, the CPU determines whether the current driving scene SCN corresponds to the driving scene SM (FIG. 5B). When the CPU determines that the current driving scene SCN corresponds to the driving scene SM (104; Yes), the process proceeds to step 106. On the other hand, if the CPU determines that the current driving scene SCN does not correspond to the driving scene SM (if the driving scene SCN corresponds to the driving scene SL (FIG. 5C) (104; No)), the process proceeds to step 107.

When the CPU proceeds from step 103 to step 105, the CPU corrects the torque applied to the steering shaft 312 from the electric motor 32 with reference to table TBH (FIG. 5A). The CPU then proceeds to step 108 and ends the execution of the program PR1.

When the CPU proceeds from step 104 to step 106, the CPU corrects the torque applied to the steering shaft 312 from the electric motor 32 with reference to the table TBM (FIG. 5B). The CPU then proceeds to step 108.

When the CPU proceeds from step 104 to step 107, the CPU corrects the torque applied to the steering shaft 312 from the electric motor 32 with reference to the table TBL (FIG. 5C). The CPU then proceeds to step 108.

Effect

As described above, the steering support ECU 10 provides information to the steering shaft 312 according to the type of current driving scene SCN (SH, SM, SL) when the driver steers while executing lane trace control. Determine the assist torque ΔTa. Therefore, according to the present embodiment, it is possible to realize a steering operation feeling suitable for the driving scene SCN.

The present disclosure is not limited to the above embodiment, and various modifications can be adopted within the scope of the present disclosure.

Modification Example 1

In the embodiment described above, the steering support ECU 10 controls the electric motor 32 so that when the driver steers the vehicle while executing lane trace control, an assist torque ΔTa corresponding to the type of driving scene SCN is applied to the steering shaft 312. control. Alternatively (or in addition), the steering support ECU 10 may correct the target value Od determined based on the recognition result of the driving lane L. Specifically, the steering support ECU 10 uses the value obtained by adding the correction value Δθd to the target value Od as the target value θdsor during steering override. That is, the steering support ECU 10 shifts the target value of the steering angle θs in the same direction as the steering direction by the driver. In this case, the correction value Δθd is determined based on a table similar to the table TBsor (FIG. 5A) for determining the assist torque ΔTa described above. The absolute value of the correction value Δθd in the driving scene SM is smaller than the absolute value of the correction value Δθd in the driving scene SH, and the absolute value of the correction value Δθd in the driving scene SL is smaller than the absolute value of the correction value Δθd in the driving scene SM. In this way, the amount of reduction in steering torque Ts is adjusted depending on the type of driving scene SCN. Therefore, according to this modification, it is possible to realize a steering operation feeling suitable for the driving scene SCN.

Modification Example 2

In the above embodiment, the steering shaft 312 is driven by the electric motor 32, but the rack 314 may be driven by the electric motor 32 instead.

What is claimed is:

1. A vehicle control device comprising:
a sensor that acquires information about a host vehicle and information about a target existing around the host vehicle;
a steering device including a steering mechanism that couples a steering wheel and steered wheels of the host vehicle and an electric motor that drives the steering mechanism; and
a processor that executes lane tracing control for controlling the electric motor such that the host vehicle travels along a travel lane in which the host vehicle is traveling, the processor being configured to execute steering override control for controlling the electric motor according to a mode of an operation to rotate the steering wheel when the steering wheel is operated to rotate during execution of the lane tracing control, wherein
the processor is configured to:
control the electric motor such that torque for operating the steering wheel when a driver performs an operation to rotate the steering wheel matches a predetermined first target value in a predetermined first traveling scene in which the lane tracing control is being executed; and
control the electric motor such that the torque for operating the steering wheel when the driver performs an operation to rotate the steering wheel matches a second target value that is less than the first target value in a predetermined second traveling scene in which the lane tracing control is being executed, the second traveling scene being predefined as a traveling scene in which the steering wheel is operated to rotate less frequently than the first traveling scene.

2. The vehicle control device according to claim 1, wherein the first traveling scene includes at least one of a situation where a turn signal is activated, a situation where a vehicle is traveling on a general road, a situation where the vehicle is traveling in a work section, a situation where the vehicle is traveling near a large vehicle, a situation where an obstacle is detected, and a situation where preceding vehicle following control in which the vehicle travels so as to follow a preceding vehicle is executed.

3. The vehicle control device according to claim 2, wherein:
the processor is configured to control the electric motor such that the torque for operating the steering wheel when the driver performs an operation to rotate the steering wheel matches a third target value that is less than the second target value in a predetermined third traveling scene in which the lane tracing control is being executed, the third traveling scene being predefined as a traveling scene in which the steering wheel is operated to rotate less frequently than the second traveling scene;

the second traveling scene is a situation where the vehicle is traveling in a hands-on mode in which the lane tracing control is executable only when the driver is holding the steering wheel; and the third traveling scene is a situation where the vehicle is traveling in a hands-off mode in which the lane tracing control is executable even if the driver is not holding the steering wheel.

4. A vehicle control method comprising:

an information acquisition step of acquiring information about a host vehicle and information about a target existing around the host vehicle;

a lane tracing control step of controlling an electric motor that drives a steering mechanism of the host vehicle such that the host vehicle travels along a travel lane in which the host vehicle is traveling; and a steering override control step of controlling the electric motor according to a mode of an operation to rotate a steering wheel when the steering wheel is operated to rotate during execution of the lane tracing step, wherein the steering override control step includes:

controlling the electric motor such that torque for operating the steering wheel when a driver performs an operation to rotate the steering wheel matches a predetermined first target value in a predetermined first traveling scene in which the lane tracing control step is being executed; and controlling the electric motor such that the torque for operating the steering wheel when the driver performs an operation to rotate the steering wheel matches a second target value that is less than the first target value in a predetermined second traveling scene in which the lane tracing control step is being executed, the second traveling scene being predefined as a traveling scene in which the steering wheel is operated to rotate less frequently than the first traveling scene.

5. A non-transitory storage medium storing a vehicle control program that causes a computer of a host vehicle to execute a process comprising:

an information acquisition step of acquiring information about a host vehicle and information about a target existing around the host vehicle;

a lane tracing control step of controlling an electric motor that drives a steering mechanism of the host vehicle such that the host vehicle travels along a travel lane in which the host vehicle is traveling; and a steering override control step of controlling the electric motor according to a mode of an operation to rotate a steering wheel when the steering wheel is operated to rotate during execution of the lane tracing step, wherein the steering override control step includes:

controlling the electric motor such that torque for operating the steering wheel when a driver performs an operation to rotate the steering wheel matches a predetermined first target value in a predetermined first traveling scene in which the lane tracing control step is being executed; and controlling the electric motor such that the torque for operating the steering wheel when the driver performs an operation to rotate the steering wheel matches a second target value that is less than the first target value in a predetermined second traveling scene in which the lane tracing control step is being executed, the second traveling scene being predefined as a traveling scene in which the steering wheel is operated to rotate less frequently than the first traveling scene.

* * * * *